United States Patent
Vautrin et al.

(10) Patent No.: US 10,096,390 B2
(45) Date of Patent: Oct. 9, 2018

(54) DETERMINATION OF POSITIONS OF FUEL ASSEMBLY ELEMENTS

(71) Applicant: ELECTRICITE DE FRANCE, Paris (FR)

(72) Inventors: Denis Vautrin, Le Vesinet (FR); Nicolas Paul, Montreuil (FR)

(73) Assignee: Electricite de France, Paris (FR)

( * ) Notice: Subject to any disclaimer, the term of this patent is extended or adjusted under 35 U.S.C. 154(b) by 528 days.

(21) Appl. No.: 14/648,420

(22) PCT Filed: Nov. 25, 2013

(86) PCT No.: PCT/FR2013/052844
§ 371 (c)(1),
(2) Date: May 29, 2015

(87) PCT Pub. No.: WO2014/083266
PCT Pub. Date: Jun. 5, 2014

(65) Prior Publication Data
US 2015/0310946 A1    Oct. 29, 2015

(30) Foreign Application Priority Data
Nov. 30, 2012    (FR) ............................ 12 61470

(51) Int. Cl.
G21C 17/00     (2006.01)
G21C 3/30      (2006.01)
G21C 17/08     (2006.01)
G21C 19/19     (2006.01)
G21D 3/00      (2006.01)

(52) U.S. Cl.
CPC ............. G21C 17/00 (2013.01); G21C 3/30 (2013.01); G21C 17/08 (2013.01); G21C 19/19 (2013.01); G21D 3/001 (2013.01); Y02E 30/40 (2013.01)

(58) Field of Classification Search
CPC .......... G21C 17/00; G21C 17/08; G21C 3/30; G21D 3/001
USPC ........................................... 376/258
See application file for complete search history.

(56) References Cited

U.S. PATENT DOCUMENTS

| 5,430,778 A | * | 7/1995 | Yaginuma | G21C 17/06 376/258 |
| 5,594,764 A | * | 1/1997 | Cooney | G21C 17/08 376/258 |
| 2013/0195237 A1 | * | 8/2013 | Tournant | G21C 17/08 376/258 |

OTHER PUBLICATIONS

Edmundson et al., "Underwater Photogrammetric Verification of Nuclear Fuel Assemblies via Natural Feature Measurement," The Journal of the CMSC, vol. 2(1), pp. 4-10 (2007).

* cited by examiner

*Primary Examiner* — Jack W Keith
*Assistant Examiner* — Daniel Wasil
(74) *Attorney, Agent, or Firm* — Drinker Biddle & Reath LLP (57) ABSTRACT

A method for determining positions of elements of fuel assemblies arranged in a nuclear vessel is described herein. According to an implementation, the method involves capturing a plurality of images of a nuclear vessel and using the plurality of images to estimate a first set of positions of S-holes of a fuel assembly of the nuclear vessel. The method further involves determining a value representative of differences between: (a) the distances from the estimated set of positions to a location on a face of the fuel assembly and (b) known actual distances between the S-holes and the location on the face of the fuel assembly.

10 Claims, 4 Drawing Sheets

DETERMINATION OF POSITIONS OF FUEL ASSEMBLY ELEMENTS

CROSS-REFERENCE TO RELATED APPLICATIONS

This application is the U.S. national phase of the International Patent Application No. PCT/FR2013/052844 filed Nov. 25, 2013, which claims the benefit of French Application No. 12 61470 filed Nov. 30, 2012, the entire content of which is incorporated herein by reference.

FIELD

The present invention relates to the determination of positions of objects, such as fuel assemblies of a vessel of a nuclear reactor, using a method for optimized estimation of positions.

It particularly but not exclusively relates to safety applications for fuel assemblies of a nuclear reactor.

BACKGROUND

In a vessel of a nuclear reactor of a power station, the fuel assemblies forming the reactor core are periodically inspected and replaced. New fuel assemblies must therefore be loaded into the reactor core and the spent ones removed.

Once the new fuel assemblies are loaded, they need to be checked to verify that they are correctly positioned before the vessel is closed with a cover comprising the upper internals assembly (UIA). The UIA elements comprise projecting pins intended to be introduced into corresponding housings in the fuel assemblies, referred to as "S holes".

A set of nominal positions is ideally defined for the fuel assemblies. However, it is possible that a fuel assembly will be offset from its nominal position beyond its ability to recenter itself, which creates a risk of the assembly catching when the UIA is lowered. Such an offset can force the entry of the UIA pins into the S holes of the fuel assemblies. Although this does not impact the operation of the nuclear reactor, the fuel assemblies can remain caught on the UIA the next time the vessel is opened, resulting in long and costly maneuvers to free them and creating a potential safety hazard for the facility.

In addition, the fuel assemblies are immersed in water, which makes it even more difficult to free the fuel assemblies in a safe and secure manner.

It is therefore necessary to accurately determine a position for each S hole of the fuel assemblies before lowering the UIA, in order to be able to intervene if one of the assemblies is too far from its nominal position (and is therefore likely to subsequently become stuck on the UIA). Due to various constraints, particularly the fact that the fuel assemblies are immersed in water, it is difficult to accurately estimate the position of the S holes. Turbulence due to variations in the liquid medium (local temperature differences) complicate such estimates.

The position of an S hole is estimated with a certain uncertainty which is the maximum difference between the position "estimated" by the detection method and the "actual" position of the S hole. The actual position of each S hole is not known: it is located within a circle A whose center is the "estimated" position and whose radius is equal to the maximum error of the detection method.

To prevent a fuel assembly from remaining stuck when the cover is opened, a tolerance for the distance that can be allowed between the "nominal" position of the fuel assembly and the actual position is 8.3 millimeters (mm). This is expressed as the "actual" position of the fuel assembly being within a circle B having the "nominal" position of the fuel assembly as its center and having a radius of 8.3 mm.

By incorporating the uncertainty related to the method, this means that the difference between the position estimated by the method, allowing for uncertainty, and the nominal position is less than 8.3 mm.

Figure 1:
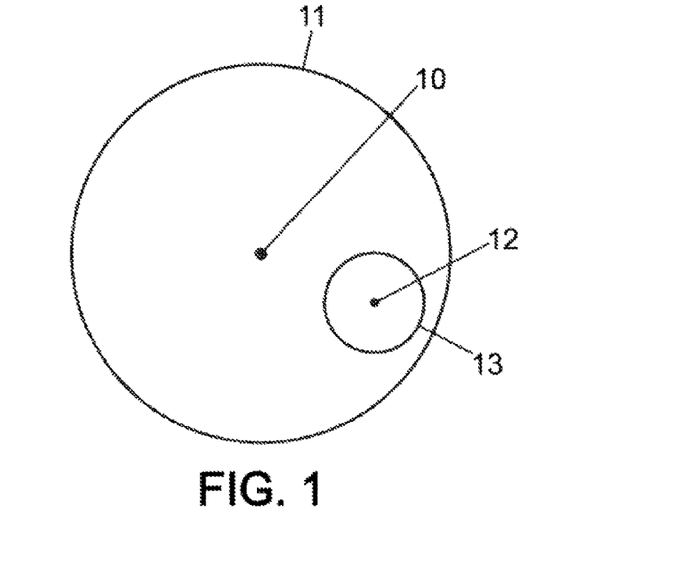
FIG. 1 shows the allowed tolerance for the difference between the nominal position and the estimated position of an S hole, based on the uncertainty associated with the method for determining current positions of the S hole.

This condition will be better understood by referring to FIG. 1.

A nominal position 10 of an S hole is known. Circle B is denoted 11 and the radius of the circle 11 corresponds to said tolerance (for example 8.3 mm).

The position estimated by the method is denoted 12. The circle A denoted 13 is centered around the estimated position 12 and has a radius corresponding to the maximum error of the detection method.

To prevent the fuel assembly from catching when the cover is opened, circle 13 must therefore be fully contained within circle 11. Whenever there is a circle 13 that lies at least partially outside of circle 11, the corresponding fuel assembly must be flagged as incorrectly positioned in order to initiate repositioning operations prior to lowering the UTA. These repositioning operations significantly increase the duration of plant shutdown and therefore reduce plant availability.

If the maximum error of the detection method is large, and in particular if it approaches the tolerance value (for example 8.3 mm), the detection becomes ineffective because many assemblies will be considered poorly positioned because of the uncertainty even though their actual position is close to the nominal position.

One major challenge is therefore to minimize as much as possible the maximum error of the detection method, between the position estimated by the method and the actual position of an S hole. The maximum error must be small in any event, given the tolerance for the difference between the actual position and the nominal position.

Several methods are known for estimating the positions of S holes. They generally consist of capturing numerous photos of the vessel from different viewpoints. In these shots, the different S holes are located by image processing methods that can identify circles or ellipses. Then the various shots are positioned relative to each other in order to construct a complete map of the vessel.

However, many sources of error can degrade the accuracy of these estimates, for example:
poor image quality (turbulence due to heat generation, insufficient contrast, etc);
camera instability (variation in angle and height).

Tests conducted on models where the actual positions of the S holes are known, show that the maximum error between the estimated positions of the S holes and the actual positions can be as large as 7 mm, which is too close to 8.3 mm for these detection methods to be usable.

There is therefore a need to significantly reduce the maximum error associated with prior art detection methods, between the position estimated by these methods and the actual position of the S holes.

SUMMARY

The present invention improves the situation.

A first aspect of the invention concerns a method for determining (typically by estimate optimization) positions of elements of fuel assemblies arranged in a vessel, each fuel assembly comprising at least one element, at least one geometric constraint of the fuel assembly or of the vessel being predefined, the method comprising the following steps:

obtaining a first set of previously estimated positions of the elements;

determining a criterion representative of the distances between the positions of the first set and parameters to be optimized, the parameters identifying possible positions of the elements, the possible positions satisfying the predefined geometric constraint;

determining a second set of estimated positions optimized on the basis of the parameters for which the criterion is minimized as per a predetermined norm.

The invention thus takes into account a predefined geometric constraint when determining the second set of optimized estimated positions. No restrictions are placed on the geometric constraint concerned. It may, for example, be a constraint on the fuel assemblies (width of the assemblies, distance between elements of an assembly) or a constraint on the vessel (size and shape of the vessel). Optimized estimated positions are thus determined that are close to the previously estimated positions and which also satisfy the geometric constraint. Indeed, as the parameters vary among the possible positions determined by the geometric constraint, the positions of the obtained second set do indeed satisfy the geometric constraint.

No restrictions are placed on the method for obtaining the first set of previously estimated positions. A videocamera or camera can be moved about above the vessel within a spatial plane at constant height z in order to capture a video or a set of images which can be used to determine the first set of previously estimated positions.

Nor are any restrictions placed on the method used to minimize a criterion according to parameters. Known methods such as the MATLAB™ fmincon function can be used, for example.

"Element" is understood to mean any part of a fuel assembly that it may be useful to pinpoint. For example, it may be the S holes, as discussed in the introduction. By improving the accuracy of identifying S hole locations, one can more reliably detect the possibility of the UIA becoming stuck in the S holes.

Several example criteria will be provided below, although the invention is in no way limited to a determination of one of these criteria.

According to one embodiment of the invention, each fuel assembly can comprise at least two elements located on a face of the fuel assembly, and a predefined geometric constraint can be, for each fuel assembly, a position of each element relative to a center of the face of the fuel assembly.

This embodiment ensures that the relative positions between the elements of a fuel assembly reflect reality. The geometry of a fuel assembly is generally known in advance. By integrating this constraint into the criterion minimization, compliance with the actual geometry of the fuel assemblies is ensured.

In addition, for each fuel assembly, the parameters can be three coordinates identifying the face of the fuel assembly in a plane, the three coordinates comprising two coordinates for the center of the face and an angle of rotation of the face relative to an axis of the plane, and the second set of optimized estimated positions can be determined for each fuel assembly by using the parameters representative of the position of the center of the face and the predefined relative positions of each element with respect to the center of the face.

Thus, the problem of criterion minimization is solved for the coordinates of the centers of the fuel assemblies. From these coordinates, it is possible to directly deduce the optimized estimated positions of the elements, as the geometry of the face of each fuel assembly is known.

Additionally or alternatively, a predefined geometric constraint may comprise a minimum distance between the centers of two different fuel assemblies and/or between the center of one assembly and an end of another fuel assembly.

Such an embodiment further allows taking into account the impossibility of two fuel assemblies overlapping. Due to detection errors that led to obtaining the first set of previously estimated positions, it is possible for these previously estimated positions to have intersecting fuel assemblies. This geometric constraint can be included in the criterion minimization in order to correct this anomaly.

In addition, the minimum distance may be a function of the respective widths of the fuel assemblies.

"Width" is understood to mean the smallest dimension of the face of a fuel assembly in the plane concerned.

In one embodiment of the invention, the geometric constraint may be a maximum distance between elements of two fuel assemblies, the maximum distance being determined by the geometry of the vessel.

Thus, the invention also allows taking into account the geometry of the vessel. It is not possible for the fuel assembly elements to be located beyond the walls of the vessel. This problem is not considered when obtaining the first set of previously estimated positions, but the invention allows taking this geometric constraint into account in the criterion minimization.

In addition, the fuel assembly elements may be comprised in a plane identified by an x-axis (for abscissae) and a y-axis (for ordinates), the nominal positions of the fuel assemblies in the vessel may be predefined, the fuel assemblies being arranged in rows and columns in the vessel, the fuel assemblies may comprise a first subset of fuel assemblies having respective maximum ordinate elements and a second subset of fuel assemblies having respective minimum ordinate elements, and the distance between the ordinate of the possible position of an element of a first fuel assembly of the first set and the ordinate of the possible position of an element of a second fuel assembly of the second set may be less than a maximum distance between the first and second fuel assemblies, the maximum distance being defined by the geometry of the vessel.

The criterion minimization is thus constrained by a plurality of geometric constraints related to the vessel, taking into account the positions of the fuel assemblies relative to each other. The precision associated with the determination of the second set of optimized estimated positions is therefore increased.

According to one embodiment of the invention, the criterion is minimized at least twice for at least two initializations of different parameters to be optimized, and the second set of optimized estimated positions can be determined based on the parameters associated with the smallest value obtained for the criterion after minimization.

A single initialization of the parameters provides a minimized criterion that is not necessarily an absolute minimum, due to the non-convexity of the set of solutions satisfying the constraint or constraints. By iterating the criterion minimization for several initializations, the precision in the determination of the second set of optimized estimated positions is improved. The invention also allows for a number of initializations that is greater than two.

According to one embodiment of the invention, the criterion representative of the distances between the previously estimated positions of the first set and the parameters to be optimized may be a least squares criterion.

In one embodiment, the method further comprises the steps of:

comparing the optimized estimated positions of the second set with the nominal positions of the fuel assembly elements; and if the difference between an optimized estimated position of a fuel assembly element and the nominal position of the element is greater than a predetermined threshold, issuing an alert so that the position of the fuel assembly can be adjusted.

A second aspect of the invention relates to a computer program product comprising program instructions stored on a computer-readable medium, for executing the steps of the method according to the first aspect of the invention.

A third aspect of the invention relates to a device for determining positions of fuel assembly elements within a vessel, each fuel assembly comprising at least one element, at least one geometric constraint of the fuel assembly or of the vessel being predefined, the device comprising:

a unit for obtaining a first set of previously estimated positions of the elements;

a first unit for determining a criterion representative of the distances between the positions of the first set and parameters to be optimized, the parameters identifying possible positions of the elements, the possible positions satisfying the predefined geometric constraint;

a second unit for determining a second set of estimated positions optimized on the basis of the parameters for which the criterion is minimized as per a predetermined norm.

In one embodiment, the device further comprises:

a unit for comparing the optimized estimated positions of the second set with the nominal positions of the fuel assembly elements; and a warning unit which, if the difference between an optimized estimated position of a fuel assembly element and the nominal position of the element is greater than a predetermined threshold, issues an alert so that the current position of the fuel assembly can be adjusted.

BRIEF DESCRIPTION OF THE DRAWINGS

Other features and advantages of the invention will become apparent from the following detailed description and from the accompanying drawings in which.

DETAILED DESCRIPTION

Figure 2:
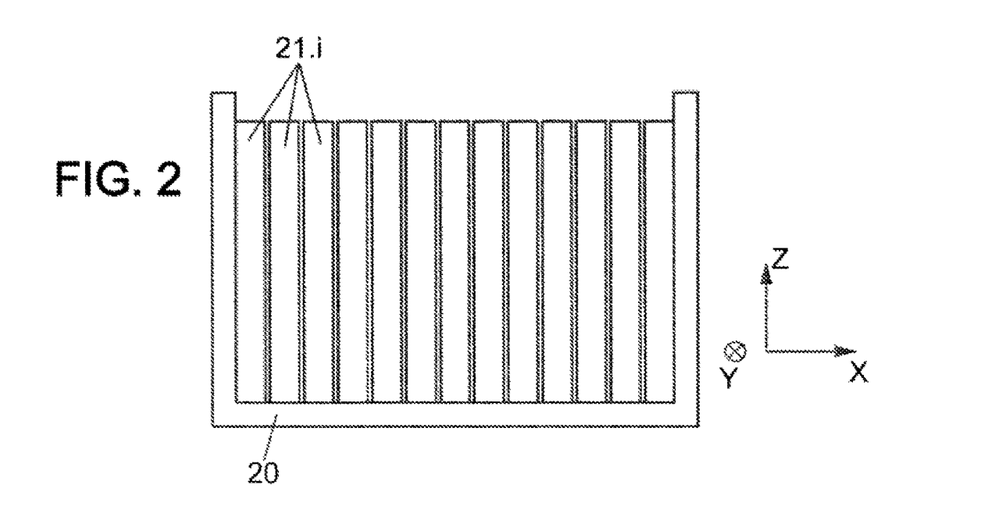
FIG. 2 shows a section in a vertical plane (x, z) of a nuclear reactor vessel comprising a plurality of fuel assemblies.

FIG. 2 shows a vessel 20 of a nuclear reactor comprising a plurality of fuel assemblies 21, each assembly 21 having an associated index, i for example, between 1 and $n_A$ where $n_A$ is the total number of fuel assemblies in the vessel 20. The number $n_A$ of fuel assemblies 21.$i$ and their nominal positions are preferably predefined. As is represented in FIG. 2, the fuel assemblies 21 are separated by an inter-assembly gap. A three-dimensional coordinate system (x, y, z) is defined and FIG. 2 shows a cross-section within plane (x, z). A cover of the vessel 20, not represented in FIG. 2, is provided for covering the vessel 20 and the UIA then engage with the S holes of the fuel assemblies 21. In the description that follows, each fuel assembly is considered to have two S holes. However, no restriction is placed on the number of S holes of a fuel assembly 21. Alternatively, it is possible to identify the locations of fuel assembly elements other than S holes. S holes are discussed in the following by way of example.

The dimensions of the vessel can also be known (possibly with some uncertainty, for example equal to 1 mm), and a vessel structure will be discussed further below (with reference to FIG. 6).

Figure 3:
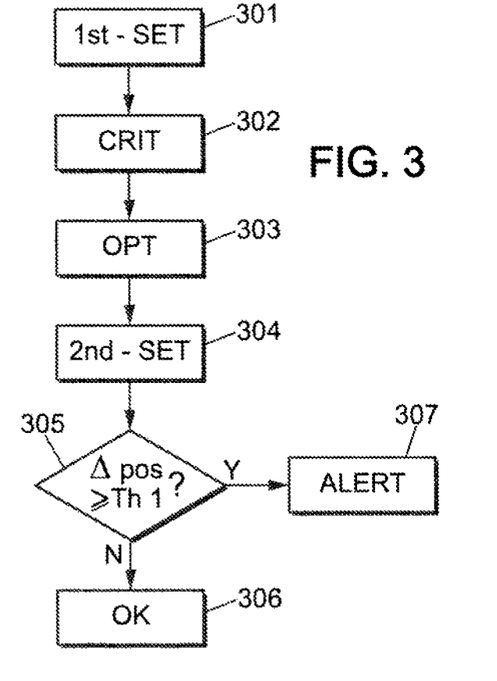
FIG. 3 is a diagram representing the steps of a method according to some embodiments.

FIG. 3 is a flowchart illustrating the steps of a method according to some embodiments of the invention.

In step 301, a first set of previously estimated positions of the S holes of fuel assemblies 21.$i$ is obtained. No restrictions are placed on the method for obtaining the first set of previously estimated positions. For example, any known method may be employed. A videocamera or camera may be used for this purpose, moved about above the vessel within a spatial plane at constant height z in order to capture a video or a set of images which can be used to determine the first set of previously estimated positions. In addition, the method described in patent application FR1150655 may for example be applied for restoring the captured images.

The present invention provides for obtaining one or more previously estimated positions for each S hole. The capture of a single video or a single set of images of the vessel can be used to infer several different estimates for the estimated position of an S hole. These estimates are added to the first set.

Each previously estimated position of an S hole comprises an abscissa, an ordinate, and possibly an elevation, indexed by the index of the assembly comprising the S hole. It is also necessary to differentiate the two S holes of a same fuel assembly. For this purpose, referring to FIG. 4, a fuel assembly 21.$i$ comprises a first S hole 41.1 located at "the lower right" and a second S hole 41.2 located at "the top left". The number of S holes per fuel assembly 21.$i$ and their relative positions in the fuel assembly are provided in FIG. 4 for illustrative purposes only. It is, of course, possible to change the relative positions of the S holes, or to add or subtract S holes.

The previously estimated positions of the first set are imprecise in prior art techniques, as they do not take into account predefined geometric constraints of the vessel and/or of the fuel assemblies.

The distance between the centers of two S holes of the same fuel assembly is referred to as the "center-to-center distance". Due to the low quality of the captured images, the previously estimated positions of two S holes of a same fuel assembly 21.*i* may be separated by a distance which is different from the center-to-center distance of the fuel assembly 21.*i*, although the fuel assembly is not deformable (given the low mechanical stresses it is subjected to). In addition, it is possible for some fuel assemblies 21.8 to overlap according to the previously estimated positions, which is not possible from a practical point of view, or for some fuel assemblies 21.*i* to occupy a larger space than what is defined by the internal structure of the tank.

The present invention proposes optimizing the first set of previously estimated positions in order to obtain a second set of optimized estimated positions that satisfy at least one of the geometric constraints defined above.

In step 302, a criterion representative of the distances between the previously estimated positions of the first set and the possible positions of the elements is determined, the possible positions satisfying the predefined geometric constraint(s).

For example, as detailed in the following, the criterion in question may be a least squares criterion.

In order to integrate the geometric constraint in which the center-to-center distance is constant, the positions of two S holes of a same fuel assembly 21.*i* are expressed relative to the center of that assembly. Referring again to FIG. 4, the fuel assembly 21.*i* is square with sides L, and has a center 40. The inclination of the fuel assembly relative to the x-axis is indicated by the angle $\theta_i$. The position of S hole 41.1 is identified by the coordinates of the center 42.1 of S hole 41.1 and the position of S hole 41.2 is identified by the coordinates of the center 42.2 of S hole 41.2. The center-to-center distance is denoted D below.

Figure 4:
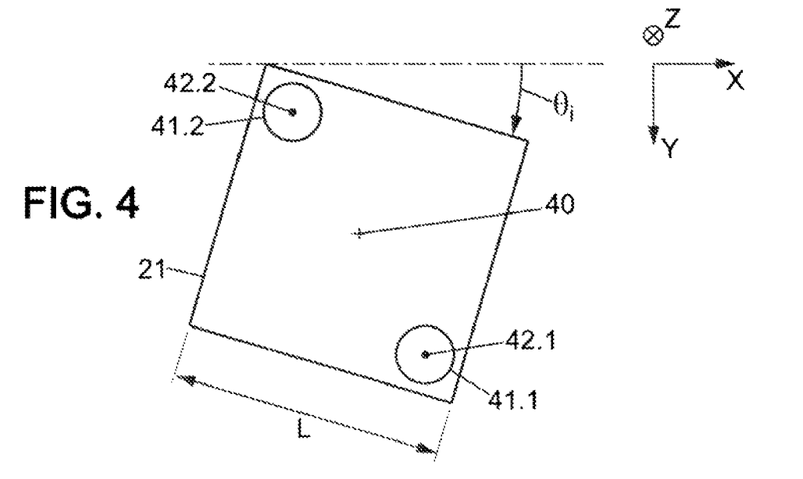
FIG. 4 shows a section in a horizontal plane (x, y) of a fuel assembly.

The abscissa of center 40 of the fuel assembly is denoted $x_i^C$ and its ordinate is denoted $y_i^C$.

For the triplet $(x_i^C, y_i^C, \theta_i^C)$, the coordinates of center 42.2 of S hole 41.2, defining its position, are given by:

$$x_i^H = x_i^C - \frac{D}{2}\cos\left(-\frac{\pi}{4} + \theta_i\right); \quad (1)$$

$$y_i^H = y_i^C - \frac{D}{2}\sin\left(-\frac{\pi}{4} + \theta_i\right). \quad (2)$$

Similarly, the coordinates of center 42.1 of S hole 41.1, defining its position, are given by:

$$x_i^B = x_i^C + \frac{D}{2}\cos\left(-\frac{\pi}{4} + \theta_i\right); \quad (3)$$

$$y_i^B = y_i^C + \frac{D}{2}\sin\left(-\frac{\pi}{4} + \theta_i\right). \quad (4)$$

By identifying the position of the S holes 41.1 and 41.2 as a function of the center 40 of the fuel assembly 21.*i* that comprises them, the geometric constraint on the center-to-center distance of the assemblies 21.*i* is taken into account.

For the following discussion, the previously estimated positions of the first set resulting from step 301 are indicated by the following notations:

$n_i^H$ (respectively $n_i^B$) is the number of previously estimated positions for center 42.2 (respectively 42.1) of S hole 41.2 (respectively 41.1) located at the top left (respectively the bottom right) of fuel assembly 21.*i* of index i. $n_i^H$ and $n_i^B$ are greater than or equal to 1;

for the $j^{th}$ previously estimated position for S hole 41.2 of fuel assembly 21.*i*, j ranging between 1 and $n_i^H$, $(x_{i,j}^H, y_{i,j}^H)$ are the coordinates defining the previously estimated position;

for the $j^{th}$ previously estimated position for S hole 41.1 of fuel assembly 21.*i*, j ranging between 1 and $n_i^B$, $(x_{i,j}^B, y_{i,j}^B)$ are the coordinates defining the previously estimated position.

From these data, a criterion C in the least squares sense can be defined in step 302 as follows:

$$C = \sum_{i=1}^{n_A}\left(\sum_{j=1}^{n_i^H}\left\|\begin{array}{c}x_i^C - \frac{D}{2}\cos\left(-\frac{\pi}{4}+\theta_i\right) - x_{i,j}^H \\ y_i^C - \frac{D}{2}\sin\left(-\frac{\pi}{4}+\theta_i\right) - y_{i,j}^H\end{array}\right\|^2 + \right.$$

$$\left.\sum_{j=1}^{n_i^B}\left\|\begin{array}{c}x_i^C + \frac{D}{2}\cos\left(-\frac{\pi}{4}+\theta_i\right) - x_{i,j}^B \\ y_i^C + \frac{D}{2}\sin\left(-\frac{\pi}{4}+\theta_i\right) - y_{i,j}^B\end{array}\right\|^2\right)$$

No restriction is placed on the norm $\|\ \|$ considered above.

As detailed below, no restrictions are placed on the criterion considered, criterion C being given as an illustration. Using criterion C, it is possible to vary parameters and $x_i^C$, $y_i^C$ and $\theta_i$ in order to minimize the criterion. Parameters and $x_i^C$, $y_i^C$ and $\theta_i$ that minimize criterion C are obtained in step 303.

For example, to solve the problem of minimizing criterion C, one approximation consists of considering the desired values of $\theta_i$ to be very close to 0. The expression of criterion C can then be linearized and written in matrix form:

$$C = \sum_{i=1}^{n_A}\left(\sum_{j=1}^{n_i^H}\|M_H X_i - Y_{i,j}^H\|^2 + \sum_{j=1}^{n_i^B}\|M_B X_i - Y_{i,j}^B\|^2\right)$$

where:

$$X_i = \begin{bmatrix} x_i^C \\ y_i^C \\ \theta_i \end{bmatrix};$$

$$M_H = \begin{bmatrix} 1 & 0 & -\frac{D}{2\sqrt{2}} \\ 0 & 1 & -\frac{D}{2\sqrt{2}} \end{bmatrix}; \quad M_B = \begin{bmatrix} 1 & 0 & \frac{D}{2\sqrt{2}} \\ 0 & 1 & \frac{D}{2\sqrt{2}} \end{bmatrix};$$

$$Y_{i,j}^H = \begin{bmatrix} x_{i,j}^H + \frac{D}{2\sqrt{2}} \\ y_{i,j}^H - \frac{D}{2\sqrt{2}} \end{bmatrix} \text{ and } Y_{i,j}^B = \begin{bmatrix} x_{i,j}^B - \frac{D}{2\sqrt{2}} \\ y_{i,j}^B + \frac{D}{2\sqrt{2}} \end{bmatrix}.$$

In order to accelerate convergence of the algorithm to a criterion minimizer, the various parameters $$X_i = \begin{bmatrix} x_i^C \\ y_i^C \\ \theta_i \end{bmatrix}$$

of the criterion are optimized together. For this purpose, the set of parameters, for i ranging between 1 and $n_A$, can be grouped in the same vector X of size $3n_A$.

Ignoring the constant terms, the criterion expression is then written in the form:

$$C = \frac{1}{2} X^T H X + f^T X.$$

It is possible to take into account other geometric constraints in order to constrain the criterion C minimization problem.

Figure 5:
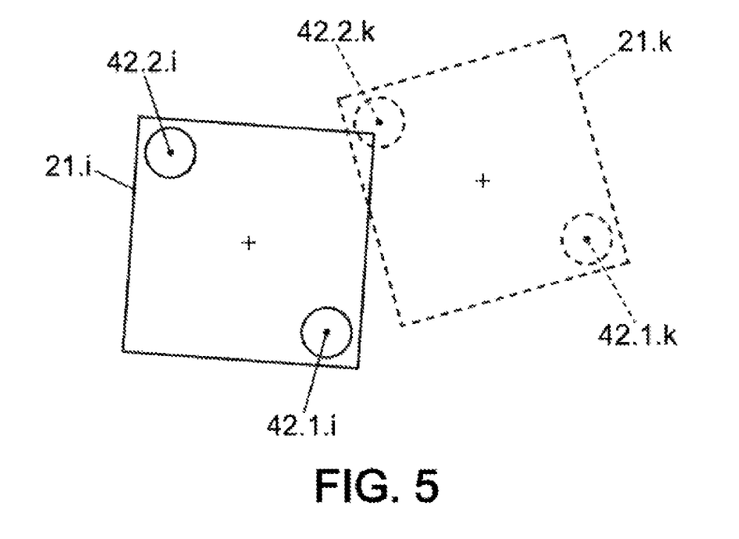
FIG. 5 shows a section in a horizontal plane (x, y) of two fuel assemblies where the positions were identified by a prior art method in a case where there is an overlap in the previously estimated positions.

A second geometric constraint to consider concerns the non-overlapping of fuel assemblies 21.i. FIG. 5 shows a top view (cross-section in the horizontal plane (x, y)) of two fuel assemblies 21.i and 21.k having positions identified by a method of the prior art, in a case where there is overlap according to the previously estimated positions.

The prior art methods for estimating the positions of S holes do not take into account the geometry of the fuel assemblies, as the centers 42.1.i and 42.2.i of the S holes of the first fuel assembly 21.i and the centers 42.1.k and 42.2.k of the S holes of the second fuel assembly 21.h can be located as shown in FIG. 5. Such estimates are inconsistent because the assemblies 21.i and 21.k overlap. The present invention therefore proposes taking the geometry of the fuel assemblies 21.i and 21.k into account.

Considering two adjacent fuel assemblies 21.i and 21.k in the vessel 20, the following five inequality constraints can be expressed:

i) the distance, according to the L1 norm (sum of the absolute value of differences between respective abscissae and respective ordinates), between center 40 of fuel assembly 21.i and the two nearest corners of fuel assembly 21.k must be greater than $$\frac{L}{\sqrt{2}},$$

L indicating the width of fuel assembly 21.i (all fuel assemblies are considered to have the same width).

Figure 6:
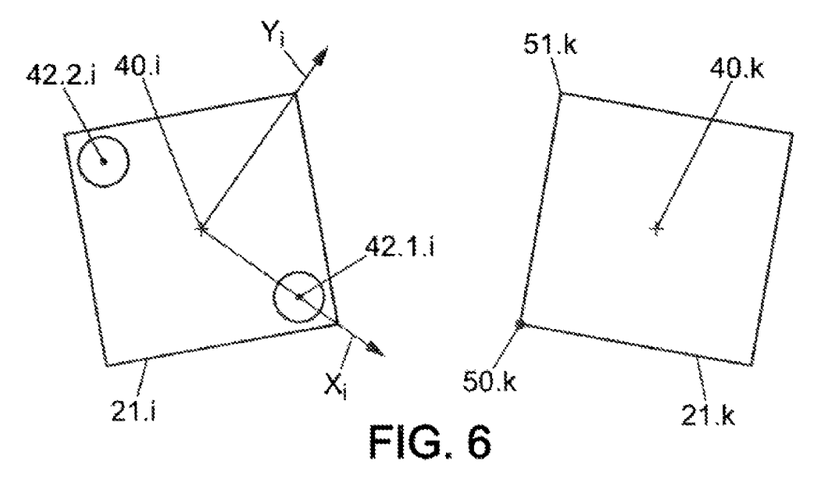
FIG. 6 shows a section in a horizontal plane (x, y) of two fuel assemblies.

FIG. 6 shows a top view (cross-section in a horizontal plane (x,y)) of two fuel assemblies 21.i and 21.k. An orthonormal system is defined where the origin is center 40.i of fuel assembly 21.i and the axes are denoted $X_i$ and $Y_i$ (such that axis Xi passes through centers 42.1.i and 42.2.i of the S holes of fuel assembly 21.i). The position of a corner 50.k of fuel assembly 21.k is identified by the coordinates $(X_{i,k}^1, Y_{i,k}^1)$ in this orthonormal system.

In this system, the first of the three geometric constraints of no overlapping is written as:

$$|X_{i,k}^1| + |Y_{i,k}^1| \geq \frac{L}{\sqrt{2}}.$$

To return to the original coordinate system (axes x, y and z), a translation and rotation must be applied:

$$|(x_{i,k}^1 - x_i^C)\cos(-\frac{\pi}{4} + \theta_i) + (y_{i,k}^1 - y_i^C)\sin(-\frac{\pi}{4} + \theta_i)| +$$

$$|-(x_{i,k}^1 - x_i^C)\cos(-\frac{\pi}{4} + \theta_i) + (y_{i,k}^1 - y_i^C)\cos(-\frac{\pi}{4} + \theta_i)| \geq \frac{L}{\sqrt{2}}$$

where $x_{i,j}^1$ and $y_{i,j}^1$ respectively indicate the abscissa and ordinate of corner 50.k in the initial coordinate system comprising the axes x, y, and z.

Similarly, an additional inequality is obtained for a second corner 51.k of fuel assembly 21.k.

ii) the same approach as in i) can be applied by switching the indices i and k: the distance according to the L1 norm between center 40.k of fuel assembly 21.k and the two nearest corners of fuel assembly 21.i must be greater than $$\frac{L}{\sqrt{2}},$$

which provides two additional inequalities.

iii) In addition, the Euclidean distance between the centers of fuel assemblies 21.i and 21.k must be greater than L:

$$\sqrt{(x_i^C - x_k^C)^2 + (y_i^C - y_k^C)^2} \geq L.$$

A third geometric constraint to be taken into account concerns the dimensions of the vessel 20 and the space occupied by the set of fuel assemblies 21. In order to take this geometric constraint into account, it is possible to take into account only the fuel assemblies 21 peripherally located within the vessel 20.

Figure 7:
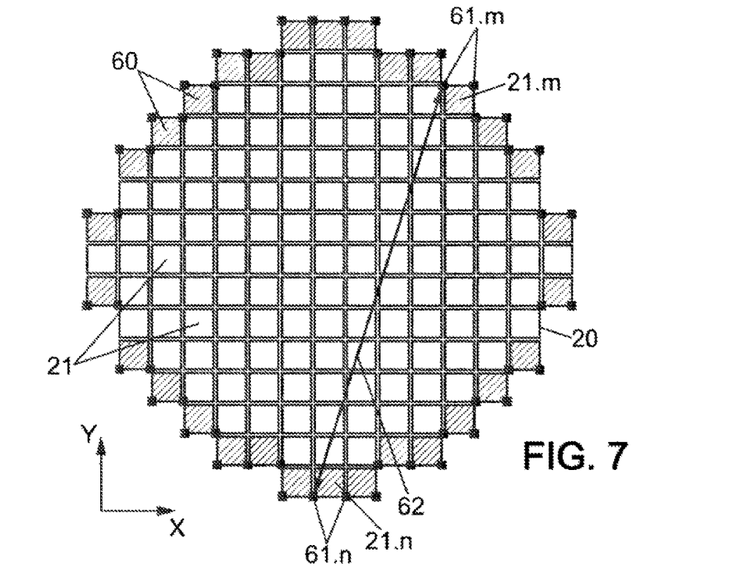
FIG. 7 shows a section in a horizontal plane (x, y) of a nuclear reactor vessel comprising a plurality of fuel assemblies.

The following description distinguishes between geometric constraints along the y-axis (ordinates) and geometric constraints along the x-axis (abscissae). FIG. 7 illustrates geometric constraints according to the y-axis.

FIG. 7 shows one geometry of a vessel 20 comprising a plurality of fuel assemblies 21 arranged in rows and columns. Among the fuel assemblies 21, some fuel assemblies 60 which, for each column, occupy extreme positions on the y axis are shaded in gray. One will note that this set of fuel assemblies 60 can be separated into a first subset having vertices (and therefore S holes) of respective maximum ordinates and a second subset having vertices (and therefore S holes) of respective minimum ordinates.

It is thus possible to define a geometric constraint, between each pair of fuel assemblies containing a fuel assembly from the first subset and a fuel assembly from the second subset.

For example, consider the fuel assemblies labeled 21.m (first subset) and 21.n (second subset). Fuel assembly 21.m comprises two vertices 61.m where the ordinates (denoted $y_m^{H1}$ and $y_m^{H2}$) are the maximum ordinates for the column of fuel assemblies comprising fuel assembly 21.m. Fuel assembly 21.n comprises two vertices 61.n where the ordinates (denoted $y_n^{B1}$ and $y_n^{B2}$) are the minimum ordinates for the column of fuel assemblies comprising fuel assembly 21.n.

The geometry of the vessel is used to find the maximum distance 62 between the two extremes of the vessel corresponding to the positions of vertices 61.m and 61.n. By projecting the distance 62 along the y axis of ordinates, a distance $D_{m,n}$ is obtained. The distance $D_{m,n}$, representing the maximum difference between the ordinates of vertices 61.m and 61.n, provides four new constraints:

$$y_m^{H1} - y_n^{B1} \leq D_{m,n};$$

$$y_m^{H2} - y_n^{B1} \leq D_{m,n};$$

$$y_m^{H1} - y_n^{B1} \leq D_{m,n};$$

$$y_m^{H2} - y_n^{B2} \leq D_{m,n};$$

As mentioned above, the geometry of the vessel may be known with some uncertainty, for example 1 mm, in which case this uncertainty is added to the distance $D_{m,n}$.

Four inequalities, such as those presented above, are obtained for each pair of fuel assemblies containing a fuel assembly of the first subset and a fuel assembly of the second subset.

Similar geometric constraints are obtained along the horizontal axis: the fuel assemblies 21 concerned are the fuel assemblies located at the left and right extremes (along the x axis).

All the inequalities defined above, based on geometric constraints related to the space occupied by the fuel assemblies relative to the vessel and on geometric constraints of fuel assemblies not overlapping, can be placed in the following form: $R_k(X) \leq 0$.

Thus, from the criterion C and the set of inequalities $R_k(X) \leq 0$ defined above, the problem of constrained optimization can be solved by means of an interior point algorithm. Such an algorithm is mentioned for illustration only; the present invention is not restricted to the use of this algorithm alone.

In particular, it is possible to use the MATLAB™ fmincon function by indicating the criterion (C) calculation function and its gradient, as well as the functions associated with the geometric constraints ($R_k(X)$).

The above algorithm is a local optimization method. However, the set of feasible solutions is not convex. For a given initialization of the parameters corresponding to possible positions of the S holes, it is possible not to converge to a solution that generally minimizes criterion C.

The invention therefore proposes running the optimization procedure for different initializations. Among the various solutions obtained, the one corresponding to the smallest value of C after convergence is retained.

In practice, it is possible to generate the various initializations by applying minor disruptions to the nominal position of the fuel assemblies 21 (shifting the centers 40 of the fuel assemblies 21, changing the angle of orientation $\theta_i$ of the fuel assemblies 21, reducing the gap between assemblies), so that the geometric constraints are satisfied in the parameter initialization.

An alternative solution for initializing the algorithm consists of solving the optimization problem by setting the angles $\theta_i$ to zero and varying only the position of the centers 40 of the fuel assemblies 21. Note that in practice, the angle of orientation $\theta_i$ of the fuel assemblies is very close to zero, and by setting $\theta_i$ to zero the convergence to the desired solution is accelerated dramatically while a high level of accuracy is maintained.

By using the parameters and $\theta_i$ that minimize criterion C and complying with the geometric constraints $R_k(X)$, step 304 provides a second set of optimized estimated positions of the S holes 41 (entirely defined by parameters $x_i^C$, $y_i^C$ and $\theta_i$ and by relations (1), (2), (3) and (4), for i ranging between 1 and $n_A$). The optimized estimated positions of the second set satisfy the geometric criterion of center-to-center distance because the optimized estimated positions of the S holes are obtained directly from the parameters $x_i^C$, $y_i^C$ and $\theta_i$ resulting from minimization of criterion C and from the geometry of the fuel assemblies 21. Compliance is also ensured with the constraints of non-overlapping and the space occupied by the fuel assemblies 21.i by constraining the criterion optimization using the set of inequalities $R_k(X)$.

The invention is not restricted to a simultaneous consideration of the three geometric constraints outlined above. Indeed, the invention may take into account other geometric constraints, or may take into account any one or two of the three constraints presented above.

In step 305, the optimized estimated positions of the S holes 41 in the second set are compared with the respective nominal positions of the S holes 41. Reusing the notations of FIG. 1, in the case where, for an S hole 41, the circle 13 centered on the optimized estimated position having a radius equal to the uncertainty of the method extends beyond the circle 11 centered on the nominal position and having a radius equal to the tolerance (for example 8.3 mm), an alert is generated in step 307 so that the fuel assembly or assemblies comprising the S hole(s) 41 concerned can be replaced.

Otherwise, the vessel cover can be closed in step 306.

Figure 8:
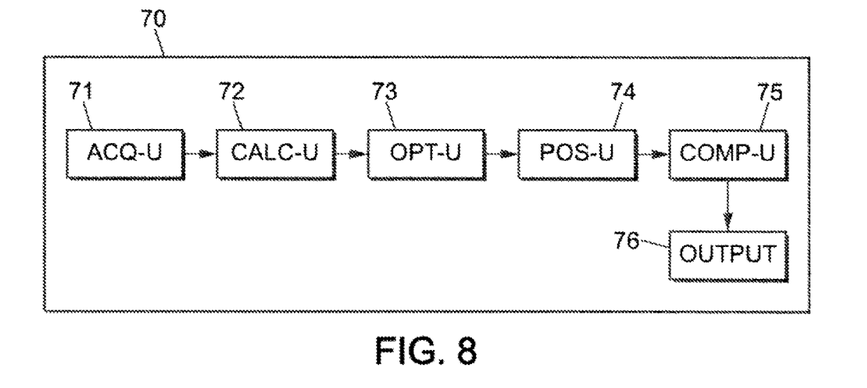
FIG. 8 illustrates a device according to some embodiments of the invention.

FIG. 8 illustrates a device 70 according to some embodiments of the invention.

The device comprises a unit 71 for obtaining a first set of previously estimated positions of fuel assembly elements (S holes, for example). As described above, no restrictions are placed on the means for acquiring the first set; a known method can be implemented.

The device 70 further comprises a first unit 72 for determining a criterion representative of the distances between the positions of the first set and parameters to be optimized, the parameters identifying possible positions of the elements, the possible positions satisfying a predefined geometric constraint. The criterion may be a criterion in the least squares sense, or some other criterion, as described below. The parameters to be optimized may be the parameters $x_i^C$, $y_i^C$ and $\theta_i$ of fuel assemblies 21.i, as described above.

The device 70 may further comprise an optimization unit 73 for minimizing the criterion determined by the first determination unit 72, as per a predetermined norm, while satisfying the geometric constraints. As described above, the criterion may be minimized for different parameter initializations, and the smallest criterion value obtained after minimization can then be selected for deriving the parameters corresponding to the optimized estimated positions of a second set. For this purpose, a second determination unit 74 determines a second set of optimized estimated positions from the parameters for which the criterion is minimized.

In addition, the device 70 may comprise a comparator unit 75 for comparing the optimized estimated positions of the second set with the nominal positions of fuel assembly elements, and a warning unit 76 which, if the difference between an optimized estimated position of a fuel assembly element and the nominal position of the element is greater than a predetermined threshold, issues an alert so that the current position of the fuel assembly in question can be adjusted.

The invention is not restricted to the embodiments described above. It extends to other variants.

For example, steps 302 and 303 were described for determining the parameters $x_i^C$, $y_i^C$ and $\theta_i$ of different fuel assemblies 21.i which minimize a constrained least squares criterion C. This assumes that the error in the position of each S hole follows a Gaussian law.

However, the Gaussian model can be improved when modeling errors in the position of each S hole. The position error is usually small in amplitude unless there is a small number of S holes, in which case it is significantly larger. To take into account the isolated nature of some errors, the invention may use a different norm to define the following criterion C' in step 302:

$$C' = \sum_{i=1}^{n_A} \left( \begin{array}{l} \sum_{j=1}^{n_i^H} \sqrt{\left(x_i^C - \frac{D}{2}\cos\left(-\frac{\pi}{4}+\theta_i\right) - x_{i,j}^H\right)^2 + \left(y_i^C - \frac{D}{2}\sin\left(-\frac{\pi}{4}+\theta_i\right) - y_{i,j}^H\right)^2} + \\ \sum_{j=1}^{n_i^B} \sqrt{\left(x_i^C + \frac{D}{2}\cos\left(-\frac{\pi}{4}+\theta_i\right) - x_{i,j}^B\right)^2 + \left(y_i^C + \frac{D}{2}\sin\left(-\frac{\pi}{4}+\theta_i\right) - y_{i,j}^B\right)^2} \end{array} \right)$$

The disadvantage of this expression is that it is not differentiable (due to the non-differentiability of the square root of zero). The following approximation can then be used:

$$C' = \sum_{i=1}^{n_A} \left( \begin{array}{l} \sum_{j=1}^{n_i^H} \sqrt{\left(x_i^C - \frac{D}{2}\cos\left(-\frac{\pi}{4}+\theta_i\right) - x_{i,j}^H\right)^2 + \left(y_i^C - \frac{D}{2}\sin\left(-\frac{\pi}{4}+\theta_i\right) - y_{i,j}^H\right)^2 + \mu^2} + \\ \sum_{j=1}^{n_i^B} \sqrt{\left(x_i^C + \frac{D}{2}\cos\left(-\frac{\pi}{4}+\theta_i\right) - x_{i,j}^B\right)^2 + \left(y_i^C + \frac{D}{2}\sin\left(-\frac{\pi}{4}+\theta_i\right) - y_{i,j}^B\right)^2 + \mu^2} \end{array} \right)$$

The value of $\mu$ is chosen to be very small compared to the desired level of precision, in order to minimize the impact of this approximation. For example, $\mu=0.05$ mm can be chosen for a desired precision of 1 mm.

The invention extends to the inclusion of other criteria.

The invention claimed is:

1. A method for determining positions of elements of fuel assemblies arranged in a nuclear vessel, the method comprising the following steps:
   capturing a plurality of images of a nuclear vessel;
   using the plurality of images to estimate a first set of positions of S holes of a fuel assembly of the nuclear vessel;
   determining a value representative of differences between the distances from the estimated set of positions to a location on a face of the fuel assembly and known actual distances between the S-holes and the location on the face of the fuel assembly;
   selecting coordinates for the location that minimizes the determined value;
   estimating a second set of positions for the S-holes based on the selected coordinates; and
   lowering an upper internals assembly onto the fuel assembly so that projecting pins of the upper internals assembly align with positions of the S-holes consistent with the selected coordinates of the location.

2. The method according to claim 1, wherein the location is the location of a center of the face of the fuel assembly.

3. The method according to claim 2, wherein the coordinates comprise three coordinates identifying the face of said fuel assembly in a plane, the three coordinates comprising two coordinates for the center of the face and an angle of rotation of the face relative to an axis of the plane, the method further comprising repeating the using, determining, and selecting steps for each of a plurality of fuel assemblies of the nuclear vessel.

4. The method according to claim 2, further comprising:
   repeating the using, determining, and selecting steps for each of a plurality of fuel assemblies of the nuclear vessel,
   wherein, when selecting coordinates for the location, the determined value is minimized while ensuring that there is at least a minimum distance between the centers of two of the fuel assemblies and/or between the center of one of the two fuel assemblies and an end of another of the two fuel assemblies.

5. The method according to claim 4, wherein the minimum distance is a function of the respective widths of the two fuel assemblies.

6. The method according to claim 1, further comprising:
   repeating the using, determining, and selecting steps for each of a plurality of fuel assemblies of the nuclear vessel,
   wherein, when selecting coordinates for the location, the determined value is minimized while ensuring that there is at most a maximum distance between S-holes of two fuel assemblies, the maximum distance being determined by the geometry of the nuclear vessel.

7. The method according to claim 1, further comprising minimizing the value at least twice for at least two initializations of coordinates to be selected.

8. The method according to claim 1, wherein determining a value comprises calculating the value using a least squares technique.

9. The method according to claim 1, said method further comprising the steps of:
   comparing the second set of positions with nominal positions of the S-holes of the fuel assemblies; and
   if the difference between any of the second set of positions and a corresponding nominal position of said S-holes is greater than a predetermined threshold, adjusting the position of said fuel assembly.

10. A non-transitory computer readable storage product with a program stored thereon, said program comprising instructions executable by a processor to carry out the steps of the method according to claim 1.

* * * * *

UNITED STATES PATENT AND TRADEMARK OFFICE
CERTIFICATE OF CORRECTION

PATENT NO. : 10,096,390 B2  
APPLICATION NO. : 14/648420  
DATED : October 9, 2018  
INVENTOR(S) : Denis Vautrin and Nicolas Paul Page 1 of 1

It is certified that error appears in the above-identified patent and that said Letters Patent is hereby corrected as shown below:

On the Title Page

In (57) Abstract  
Lines 6 and 10, replace "S-holes" with --S holes--

In the Claims

In Claim 1, Column 13, Lines 42, 46, and 50, replace "S-holes" with --S holes--

In Claim 6, Column 14, Line 42, replace "S-holes" with --S holes--

In Claim 9, Column 14, Lines 55 and 57, replace "S-holes" with --S holes--

Signed and Sealed this  
Ninth Day of April, 2019

Andrei Iancu  
*Director of the United States Patent and Trademark Office*